US007500704B2

(12) United States Patent
Herrera et al.

(10) Patent No.: US 7,500,704 B2
(45) Date of Patent: Mar. 10, 2009

(54) COMPARTMENT ACCESS SYSTEM WITH ACTIVE MATERIAL COMPONENT AND METHOD FOR CONTROLLING ACCESS TO AN INTERIOR COMPARTMENT

(75) Inventors: Guillermo A. Herrera, Winnetka, CA (US); Paul W. Alexander, Ypsilanti, MI (US); Alan L. Browne, Grosse Pointe, MI (US); Nancy L. Johnson, Northville, MI (US); Andrew C. Keefe, Encino, CA (US); Robert E. Doty, Los Angeles, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 140 days.

(21) Appl. No.: 11/555,288

(22) Filed: Nov. 1, 2006

(65) Prior Publication Data

US 2008/0100079 A1 May 1, 2008

(51) Int. Cl.
*B60R 7/06* (2006.01)
*B60K 37/00* (2006.01)

(52) U.S. Cl. .................................................... 296/37.12

(58) Field of Classification Search ................ 296/37.1, 296/37.12

See application file for complete search history.

(56) References Cited

U.S. PATENT DOCUMENTS 6,008,992 A * 12/1999 Kawakami .................. 361/726
6,485,081 B1 * 11/2002 Bingle et al. .................. 296/76
6,815,873 B2 11/2004 Johnson et al.
6,973,701 B2 12/2005 Momada et al.
7,013,536 B2 3/2006 Golden et al.
7,032,282 B2 4/2006 Powell et al.
2006/0186700 A1 * 8/2006 Browne et al. ......... 296/187.01
2006/0186706 A1 * 8/2006 Browne et al. ......... 296/203.01
2006/0232051 A1 * 10/2006 Morris et al. ............... 280/732
2007/0063540 A1 * 3/2007 Browne et al. .............. 296/180
2007/0063541 A1 * 3/2007 Browne et al. ........... 296/180.1
2007/0118831 A1 * 5/2007 Kondo ........................ 717/121
2007/0261307 A1 * 11/2007 Alexander .................. 49/82.1
2008/0007081 A1 * 1/2008 Shibata et al. ........... 296/37.12
2008/0100092 A1 * 5/2008 Gao et al. .............. 296/146.11

FOREIGN PATENT DOCUMENTS

JP 02306082 A * 12/1990
JP 03169996 A * 7/1991

* cited by examiner

*Primary Examiner*—Glenn Dayoan
*Assistant Examiner*—Paul A Chenevert

(57) ABSTRACT

Accessing interior compartments for storage or other purposes is improved by the use of one or more active material components. Activating one or more active material components carries out one or more of the following functions: opening or closing the compartment (which may include cinching a closure) and/or latching or unlatching a closure from a frame. Activation may result from a remote trigger signal. A method is provided for controlling access to an interior compartment that may be carried out by a controller operatively connected to various active material components that unlatch the closure from the frame, close the closure and cinch the closure to the frame, respectively.

13 Claims, 6 Drawing Sheets

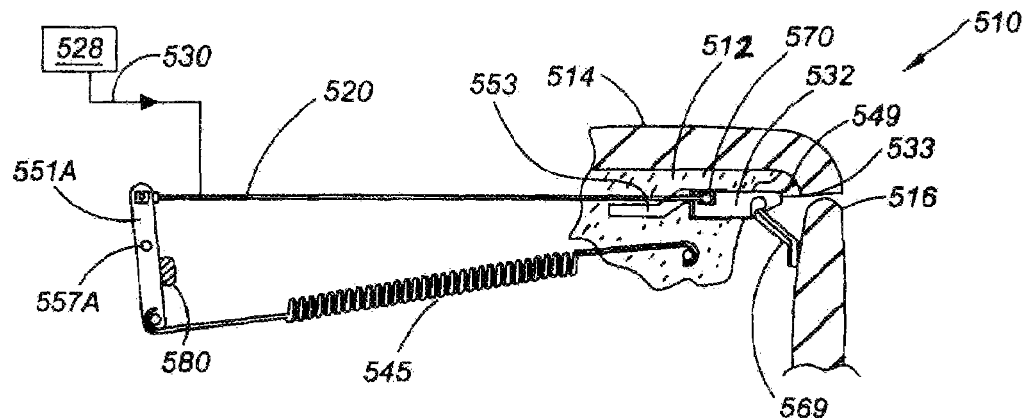
FIG. 6
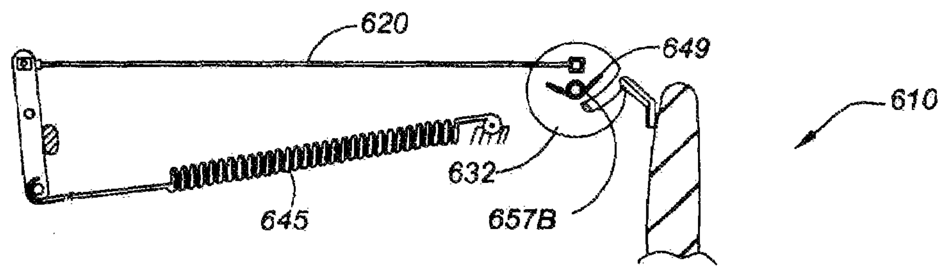
FIG. 7
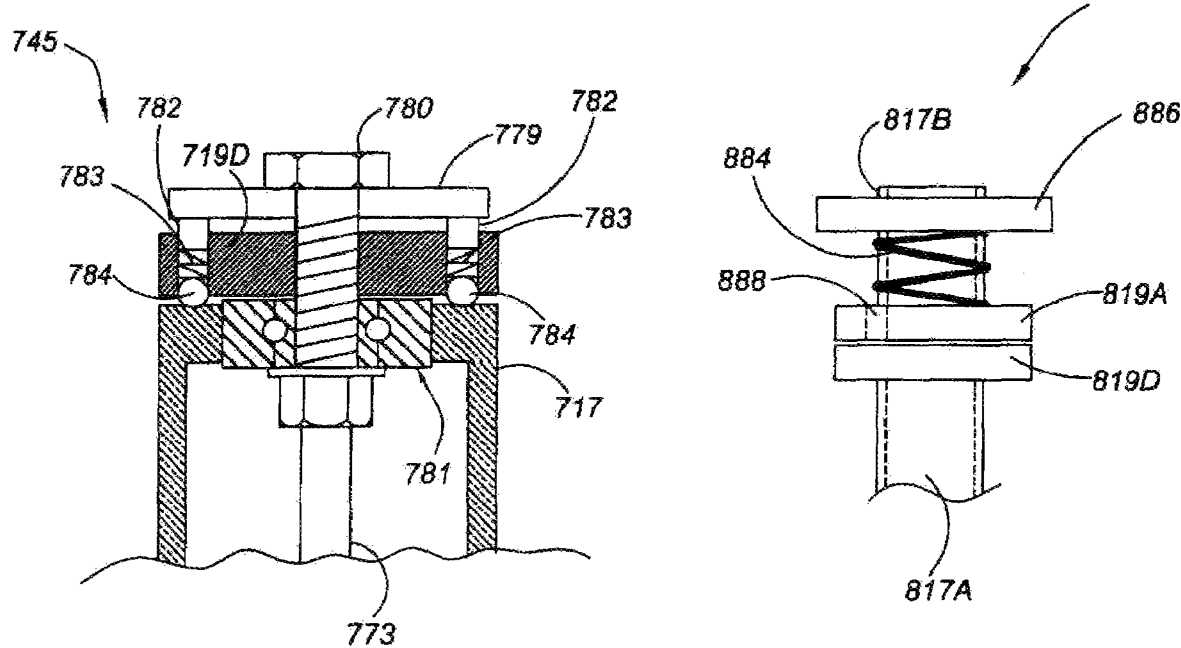
FIG. 8
FIG. 9

COMPARTMENT ACCESS SYSTEM WITH ACTIVE MATERIAL COMPONENT AND METHOD FOR CONTROLLING ACCESS TO AN INTERIOR COMPARTMENT

TECHNICAL FIELD

The invention relates to a compartment access system using at least one active material component and a method for controlling access to an interior compartment.

BACKGROUND OF THE INVENTION

The accessibility of interior compartments, such as a cupboard in a home or a vehicle storage space like an automotive glove box, is a key feature in utility and appeal to a consumer. Opening or closing a storage compartment can be difficult when carrying a load. Also, latches on some containers can be cumbersome. Disabled persons especially may lack the strength and dexterity to interface with some storage containers.

SUMMARY OF THE INVENTION

Accessing interior compartments for storage or other purposes is improved by the use of one or more active material components. Activating one or more active material components carries out one or more of the following functions: opening or closing the compartment (which may include cinching a closure) and/or latching or unlatching a closure from a frame, wherein the closure and frame substantially define the interior compartment. In one aspect of the invention, activation results from a remote trigger signal. For example, a vehicle compartment may be opened from across or even outside of the vehicle by sending a remote trigger signal to a controller, such as by depressing a button on a key fob or other device, which then causes the controller to activate the active material component. Remote triggering allows "hands-off" access to the interior compartment, which may be especially useful when carrying items to be stored or which have been removed from the compartment. Preferably, the option of manually operating the closure to access the interior compartment is also available should that be preferred in any given instance.

Accordingly, a compartment access control system is provided that includes a frame partially defining an interior compartment and a closure operatively connected to and movable with respect to the frame and further defining the compartment. An active material component is operatively connected to the closure and is configured to actuate upon activation, thereby affecting access to the compartment. As used herein, to "affect access" to the interior compartment includes closing, opening, cinching, latching and/or unlatching the closure with respect to the frame. Closing may include substantially (i) closing the closure to an intermediate position in which access to the compartment is substantially prevented and/or (ii) cinching the closure to a final closed position in preparation for latching the closure to the frame. Many different types of active materials may be utilized, as described herein. When the active material component is used for opening or closing the compartment, a storage container that has a frame with a closure operatively connected thereto to cooperatively define an interior compartment utilizes an active material component operatively connected to the closure to move the closure with respect to the frame when activated to thereby affect access to the compartment.

The compartment access system may incorporate any of several features that improve the functioning of the system. For example, a sensor may be operatively connected to the closure and to the controller so that a sensor signal sent by the sensor can inform the controller to terminate an activation signal to the active material component under certain predetermined conditions, such as when too much force is exerted on or by the closure, which could occur when an object is between the closure and the frame.

Additionally, a counter-balance member that provides a counter-balance force to oppose weight of the closure may be utilized to help control gravity-assisted opening of the closure. That is, the counter-balance member will act against the gravity force acting to open the closure, thus preventing an excessively fast opening motion, and/or to balance the weight of the closure, reducing the necessary actuation force for opening and closing the closure.

Optionally, a load-limiting mechanism operatively connected to the closure may be employed to provide a resistive force opposing the actuation force exerted by the active material component when it actuates, thereby limiting the force conveyed to the closure. The load-limiting mechanism may be of many different designs, such as a spring configured to oppose the actuation force, or, in cases where actuation causes rotational motion, a load-limiting mechanism that limits its torque provided to the closure above a certain torque load, or even an active material-based mechanism, such as a magneto-rheological fluid acting on a rotating component to resist rotation thereof (i.e., a magneto-rheological "clutch" or "lock"). Preferably, an adjustment mechanism is provided so that the resistive force of the load-limiting mechanism may be adjusted. This permits customization of the load-limiting function either on a per application or a per user basis. The configuration of the adjustment mechanism depends on the load-limiting mechanism. It may be a simple set screw that adjusts resistance when the load-limiting mechanism is a spring or it may be a variation in current sent through wires wound about a permanent magnet in the case of the magneto-rheological-based load-limiting mechanism.

A method is provided for controlling access to an interior compartment that may be carried out by a controller operatively connected to various active material components that unlatch the closure from the frame, close the closure and cinch the closure to the frame, respectively. The method includes receiving a remotely triggered trigger signal and determining whether the closure is in an open position or a closed position. If the controller determines that the closure is in the closed position, a first active material component, which unlatches the latch when activated, is activated by the controller. If, however, the closure is determined to be in an open position, the controller activates a second active material component that moves the closure to an intermediate (i.e., substantially closed but uncinched) position with respect to the frame. If a cinch sensor positioned between the frame and the closure has been contacted after the second active material component is activated, the controller may activate a third active material component to cinch the closure to the frame in preparation for latching. In the event that activation of any of the respective active material components is not successful, as determined by the controller such as by sensors indicating the position of the closure, various corresponding error signals can be sent by the controller, such as a signal sent to a light-emitting diode or other display indicating that the desired action corresponding to the trigger signal (i.e., unlatching, opening, cinching) was unsuccessful. If an error signal is sent by the controller, a manual resetting of the closure may be required, such as by manually opening, closing or cinching the closure with respect to the frame.

In one aspect of the invention, activation of the active material component or components is for predetermined amounts of time that are specifically selected to prevent over-excitation of the component(s) (e.g., overheating smart materials or depoling piezoelectrics) that may occur if an activation signal is continued for an extended period. If the controller is not programmed to continue the activation signal for only a predetermined amount of time, then deactivation of the component is required, either automatically, such as by a switch which is physically tripped to prevent the activation signal from reaching the component, or by a separate deactivation signal sent by the controller that causes discontinuation of the activation signal, such as by tripping a switch, etc.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 6 is a schematic illustration in side view of a sixth embodiment of a compartment access system for an interior compartment;

FIG. 7 is a schematic illustration in side view of a seventh embodiment of a compartment access system for an interior compartment;

FIG. 8 is a schematic side view illustration in partial cross-sectional, fragmentary view of a first load-limiting mechanism for use with a rotary motion compartment access system such as that of FIGS. 5A and 5B;

FIG. 9 is a schematic side view illustration in partial fragmentary view of a second load-limiting mechanism for use with a rotary motion compartment access system such as that of FIGS. 5A and 5B;

DESCRIPTION OF THE PREFERRED EMBODIMENTS

Figure 1:
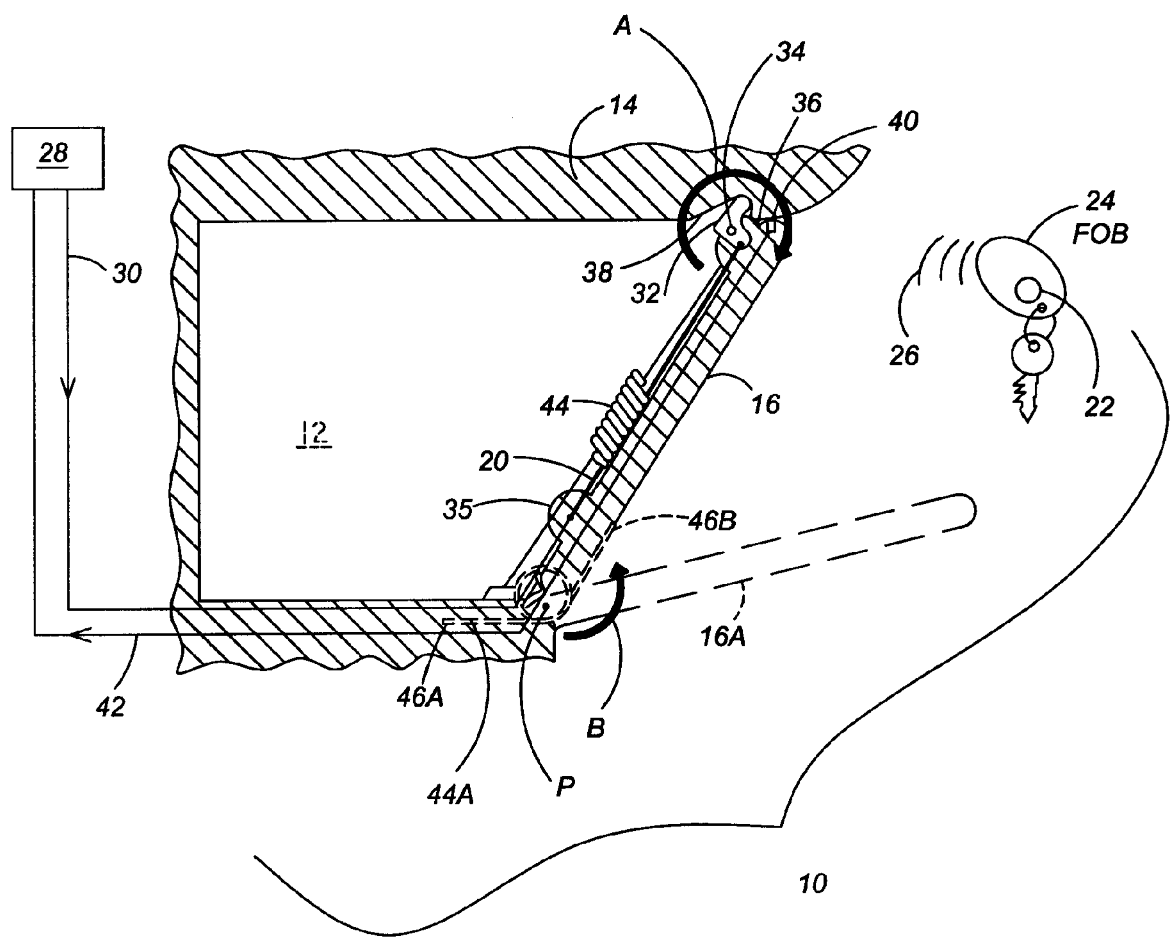
FIG. 1 is a schematic illustration in partial cross-sectional view of a first embodiment of a compartment access system for an interior compartment such as a vehicle glove box.

Referring to the drawings, wherein like reference numbers refer to like components, FIG. 1 shows a compartment access system 10 for accessing to an interior compartment 12, which may also be referred to as a storage compartment. Within the scope of the invention, the interior compartment could be used for purposes other than storage. The storage compartment 12 is partially formed and defined by a frame 14, which may be a single member or many members integrated by fasteners and the like. A closure 16 that is operatively connected to the frame 14 further forms and defines the storage compartment 12. The closure 16 and frame 14 may be referred to together as a storage compartment. The closure 16 is pivotable about a pivot point P with respect to the frame from a closed position, shown in solid, to an open position, shown in phantom, in which the closure is referred to by the reference number 16A. Those skilled in the art will recognize that closures that slide, dilate or otherwise displace, rather than pivot, with respect to a frame to form an interior compartment may also be operatively connected to one or more active material components to allow access to the compartment within the scope of the invention. The closure 16 may be manually moved between the closed and open positions, and manually latched, using a lever handle and key (not shown), as is known in the art. However, if desired, an active material component may be remotely triggered to activate an active material component that is operatively connected to the closure 16 to perform one or more of the following tasks affecting access to the interior compartment 12: opening, closing, and latching or unlatching the closure 16 with respect to the frame 14. Closing the closure may include moving the closure to a substantially closed but uncinched position with respect to the frame in which the interior compartment is inaccessible and/or cinching the closure 16 to a final closed position with respect to the frame 14 in which the closure 16 is in a position ready for latching to the frame 14.

Those skilled in the art readily understand that a wide variety of active material components are available that may be activated to affect a dimensional change causing movement or actuation. Active materials include those compositions that can exhibit a change in stiffness properties, shape and/or dimensions in response to an activation signal, which can be an electrical, magnetic, thermal or a like field depending on the different types of active materials. Preferred active materials include but are not limited to the class of shape memory materials, and combinations thereof. Shape memory materials, also sometimes referred to as smart materials, refer to materials or compositions that have the ability to remember their original shape, which can subsequently be recalled by applying an external stimulus (i.e., an activation signal). As such, deformation of the shape memory material from the original shape can be a temporary condition.

Exemplary shape memory materials include shape memory alloys (SMAs), electroactive polymers (EAPs) such as dielectric elastomers, ionic polymer metal composites (IPMC), piezoelectric polymers and shape memory polymers (SMPs), magnetic shape memory alloys (MSMA), shape memory ceramics (SMCs), baroplastics, piezoelectric ceramics, magnetorheological (MR) elastomers, ferromagnetic SMAs, electrorheological (ER) elastomers, and the like, composites of the foregoing shape memory materials with non-shape memory materials, and combinations comprising at least one of the foregoing shape memory materials. For convenience and by way of example, reference herein will be made to shape memory alloys and shape memory polymers.

The shape memory ceramics, baroplastics, and the like can be employed in a similar manner as will be appreciated by those skilled in the art in view of this disclosure. For example, with baroplastic materials, a pressure induced mixing of nanophase domains of high and low glass transition temperature (Tg) components affects the shape change. Baroplastics can be processed at relatively low temperatures repeatedly without degradation. SMCs are similar to SMAs but can tolerate much higher operating temperatures than can other shape-memory materials. An example of an SMC is a piezoelectric material.

The ability of shape memory materials to return to their original shape upon the application of external stimuli allows for their use in actuators to apply force resulting in desired motion. Smart material actuators offer the potential for a reduction in actuator size, weight, volume, cost, noise and an increase in robustness in comparison with traditional electromechanical and hydraulic means of actuation.

SMAs

Shape memory alloys (SMAs) are alloy compositions with at least two different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated (e.g., activated by resistive heating), it begins to change (i.e., actuate) into the austenite phase. The temperature at which this phenomenon starts is often referred to as austenite start temperature ($A_s$). The temperature at which this phenomenon is complete is often called the austenite finish temperature ($A_f$). When the shape memory alloy is in the austenite phase and is cooled (e.g., by terminating the resistive heating, therefore allowing cooling to ambient temperature), it begins to change into the martensite phase, and the temperature at which this phenomenon starts is often referred to as the martensite start temperature ($M_s$). The temperature at which austenite finishes transforming to martensite is often called the martensite finish temperature ($M_f$). The range between $A_s$ and $A_f$ is often referred to as the martensite-to-austenite transformation temperature range while that between $M_s$ and $M_f$ is often called the austenite-to-martensite transformation temperature range. It should be noted that the above-mentioned transition temperatures are functions of the stress experienced by the SMA sample. Generally, these temperatures increase with increasing stress. In view of the foregoing properties, deformation of the shape memory alloy is preferably at or below the austenite start temperature (at or below $A_s$). Subsequent heating (activating) above the austenite start temperature causes the deformed shape memory material sample to begin to revert back (i.e., actuate) to its original (nonstressed) permanent shape until completion at the austenite finish temperature. Thus, a suitable activation input or signal for use with shape memory alloys is a thermal activation signal having a magnitude that is sufficient to cause transformations between the martensite and austenite phases.

The temperature at which the shape memory alloy remembers its high temperature form (i.e., its original, nonstressed shape) when heated can be adjusted by slight changes in the composition of the alloy and through thermo-mechanical processing. In nickel-titanium shape memory alloys, for example, it can be changed from above about 100 degrees Celsius to below about −100 degrees Celsius. The shape recovery process can occur over a range of just a few degrees or exhibit a more gradual recovery over a wider temperature range. The start or finish of the transformation can be controlled to within several degrees depending on the desired application and alloy composition. The mechanical properties of the shape memory alloy vary greatly over the temperature range spanning their transformation, typically providing shape memory effect and superelastic effect. For example, in the martensite phase a lower elastic modulus than in the austenite phase is observed. Shape memory alloys in the martensite phase can undergo large deformations by realigning the crystal structure arrangement with the applied stress. As will be described in greater detail below, the material will retain this shape after the stress is removed.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range of the intended application.

The recovery to the austenite phase at a higher temperature is accompanied by very large (compared to that needed to deform the material) stresses (i.e., resulting actuation forces) which can be as high as the inherent yield strength of the austenite material, sometimes up to three or more times that of the deformed martensite phase. For applications that require a large number of operating cycles, a strain in the range of up to 4% or more of the deformed length of wire used can be obtained. In experiments performed with Flexinol® wires of 0.5 mm diameter, the maximum strain in the order of 4% was obtained. This percentage can increase up to 8% for thinner wires or for applications with a low number of cycles. This limit in the obtainable strain places significant constraints in the application of SMA actuators where space is limited.

SMPs

As previously mentioned, other suitable shape memory materials are shape memory polymers (SMPs). "Shape memory polymer" generally refers to a polymeric material, which exhibits a change in a property, such as a shape, a dimension, a shape orientation, or a combination comprising at least one of the foregoing properties in combination with a change in its elastic modulus upon application of an activation signal. Shape memory polymers may be thermoresponsive (i.e., the change in the property is caused by a thermal activation signal), photoresponsive (i.e., the change in the property is caused by a light-based activation signal), moisture-responsive (i.e., the change in the property is caused by a liquid activation signal such as humidity, water vapor, or water), or a combination comprising at least one of the foregoing.

Generally, SMPs are phase-segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature ($T_g$), respectively. The term “thermal transition temperature” is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the “last transition temperature”, and the lowest thermal transition temperature of the so-called “softest” segment is termed the “first transition temperature”. It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms “original shape”, “previously defined shape”, “predetermined shape”, and “permanent shape” are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

EAPS

The active material may also comprise an electroactive polymer such as ionic polymer metal composites, conductive polymers, piezoelectric polymeric material and the like. As used herein, the term “piezoelectric” is used to describe a material that mechanically deforms when a voltage potential is applied, or conversely, generates an electrical charge when mechanically deformed Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example of an electrostrictive-grafted elastomer is a piezoelectric poly(vinyldene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used for electrodes of the present disclosure may vary. Suitable materials used in an electrode may include graphite, carbon black, colloidal suspension, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

SMCs/Piezoelectric Materials

The active material may also comprise a piezoelectric material. As used herein, the term “piezoelectric” is used to describe a material that mechanically deforms (changes shape) when a voltage potential is applied, or conversely, generates an electrical charge when mechanically deformed. Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure. A commercial example of a pre-stressed unimorph is referred to as stressed “THUNDER”, which is an acronym for Thin layer composite UNimorph ferroelectric Driver and sEnsoR. THUNDER is a composite structure constructed with a piezoelectric ceramic layer (for example, lead zirconate titanate), which is electroplated on its two major faces. A metal pre-stress layer is adhered to the electroplated surface on at least one side of the ceramic layer by an adhesive layer (for example, “LaRC-SI®” developed by the National Aeronautics and Space Administration (NASA)). During manufacture of a THUNDER actuator, the ceramic layer, the adhesive layer, and the first pre-stress layer are simultaneously heated to a temperature above the melting point of the adhesive, and then subsequently allowed to cool, thereby re-solidifying and setting the adhesive layer. During the cooling process the ceramic layer becomes strained, due to the higher coefficients of thermal contraction of the metal pre-stress layer and the adhesive layer than of the ceramic layer. Also, due to the greater thermal contraction of the laminate materials than the ceramic layer, the ceramic layer deforms into an arcuate shape having a generally concave face.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with noncentrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrenesulfonate) ("PSS"), poly S-119 (Poly(vinylamine) backbone azo chromophore), and their derivatives; polyfluorocarbines, including polyvinylidene fluoride ("PVDF"), its co-polymer vinylidene fluoride ("VDF"), trifluorethylene (TrFE), and their derivatives; polychlorocarbons, including poly(vinylchloride) ("PVC"), polyvinylidene chloride ("PVC2"), and their derivatives; polyacrylonitriles ("PAN"), and their derivatives; polycarboxylic acids, including poly (metharcylic acid ("PMA"), and their derivatives; polyureas, and their derivatives; polyerethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly (N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, T, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof, and Group VIA and IIB compounds, such as CdSe, CdS, GaAs, $AgCaSe_2$, ZnSe, GaP, InP, ZnS and mixtures thereof.

MR Elastomers

Suitable active materials also comprise magnetorheological (MR) compositions, such as MR elastomers, a class of smart materials whose rheological properties can rapidly change upon application of a magnetic filed. MR elastomers are suspensions of micrometer-sized, magnetically polarizable particles in a thermoset elastic polymer or rubber. The stiffness of the elastomer structure is accomplished by changing the shear and compression/tension moduli by varying the strength of the applied magnetic field. The MR elastomers typically develop their structure when exposed to a magnetic field in as little as a few milliseconds. Discontinuing the exposure of the MR elastomers to the magnetic field reverses the process and the elastomer returns to its lower modulus state. Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

MSMAs

MSMAs are alloys, often composed of Ni—Mn—Ga, that change shape due to strain induced by a magnetic field. MSMAs have internal variants with different magnetic and crystallographic orientations. In a magnetic field, the proportions of these variants change, resulting in an overall shape change of the material. An MSMA actuator generally requires that the MSMA material be placed between coils of an electromagnet. Electric current running through the coil induces a magnetic field through the MSMA material, causing a change in shape.

In the embodiment of FIG. 1, the active material component is an SMA wire 20 that may be activated by a remote trigger such as a button 22 on a key fob 24. Depressing the button 22 sends a trigger signal 26 to a controller 28. The controller 28 includes electronic components necessary to receive the trigger signal 26, process it and send an activation signal 30 to the SMA wire 20 (along a transfer conductor (i.e., the wire shown) connecting the controller 28 with the SMA wire 20) in response to the trigger signal 26. the activation signal 30 is an electrical current in the SMA wire 20 or causes an electrical current in the SMA wire 20, which results in resistive heating of the wire 20 to cause actuation of the wire 20, i.e., a contraction thereof. The SMA wire 20 is anchored at one end to a lower extension 35 of the closure 16 and at another end to a rotary cinch 32 that is mounted to rotate about an anchor point 34 on an upper extension 36 of the closure 16. Accordingly, contracting the SMA wire 20 by resistive heating causes the rotary cinch 32 to rotate clockwise (as illustrated by arrow A) about the anchor point 34 and move into an integrated hasp 38 (i.e., the portion of the frame 14 having a recess matable with the cinch 32) built into the frame 14. When the cinch 32 moves, the closure 16 moves through the final portion of a closure motion in the direction of arrow B to a final closed position (i.e., from a substantially closed position in which closure 16 contacts frame 14 to a final closed and cinched position in which the cinch 32 is in hasp 38). The controller 28 may be programmed to continue the activation signal 30 for only a predetermined time period that allows sufficient time for heating and actuation of the wire 20 without overheating or, alternatively, until a cinch sensor 40 mounted on the closure 16 (or alternatively on the frame 14) may be used that senses contact between the frame 14 and closure 16, indicating that cinching is complete, and sends a corresponding cinch sensor signal 42 along another transfer conductor to the controller 28 which then terminates the activation signal 30. (The cinch sensor 40 could additionally or alternatively be configured to sense force acting on the closure 16 and to send a sensor signal to the controller 28 that then terminates the activation of wire 20 if the force rises to a predetermined level determined to be excessive.) When the activation signal terminates, the wire 20 cools, causing it to undergo a phase change to its preactuation state, expanding and thus creating slack, which causes the rotary cinch 32 to return to an uncinched position by rotating in an opposite direction than arrow A such that the cinch 32 comes out of the integrated hasp 38. A separate latch (not shown) would need to be actuated, either manually, by activation of a separate active material component (e.g., as shown in embodiments of FIG. 4 below), or physically triggered by completion of the cinching operation to secure the closure 16 in a final closed position even when the wire 20 cools and moves the cinch 32 to an uncinched position. Alternatively, the latch could be integrated with the cinch 32, and in order to retain the cinch 32 in the cinched position, the latch could be positioned next to the rotary cinch 32 and either manually operated or moved by activation of a separate active material component to slide into an opening in the cinch 32 when the cinch 32 moves to the cinched position, thus securing the closure 16 in a final closed position.

A counterbalance member 44 in the form of an extension spring is connected at one end to the frame 14 and at an opposing end to the extension 36 of the closure 16. As the closure is opened and pivots about pivot point P, a moment is created about the pivot point P by the weight of the closure 16

(i.e., the closure 16 opens via gravity). An opposing spring force is provided by the spring 44, which resists extending as the closure 16 is opened. The opposing spring force also increases as the closure 16 is opened as due to the offset of the connection point of the spring 44 to the frame 14 and the closure pivot point P.

An alternative counterbalance member 44A that could be used in lieu of the extension spring counterbalance member 44 is a torsion spring having arms 46A and 46B extending generally parallel with the bottom of the frame 14 and the closure 16, respectively. As the closure 16 is opened, the opposing force of the counterbalance member 44A increases as the closure 16 is opened due to the spreading of the arms 46A, 46B to balance the increasing moment due to the weight of the closure 16.

Within the scope of the invention, in the embodiment of FIG. 1 and in all of the additional embodiments, activation of the respective active material component(s) could cause a motion other than pivoting of a cinch mechanism. Instead, activation could cause the closure to open as an iris dilating or could cause a reorientation of the closure and/or the frame to allow access to the compartment, depending on the design of the closure and the connection of the active material component thereto, as will be understood by those skilled in the art.

In other embodiments described below, active material components are remotely triggerable close a closure similar to closure 16. In still other embodiments described below, an active material component is remotely triggerable to cinch the closure to the frame, wherein cinching is a final movement in closing the closure. Finally, still other embodiments utilize active material components to unlatch the closure to the frame. Those skilled in the art will readily recognize that variations would allow the active material components to open the closure or latch the closure as well, and that multiple active material components may be utilized in one compartment access system to provide any combination of these functions.

Figure 2:
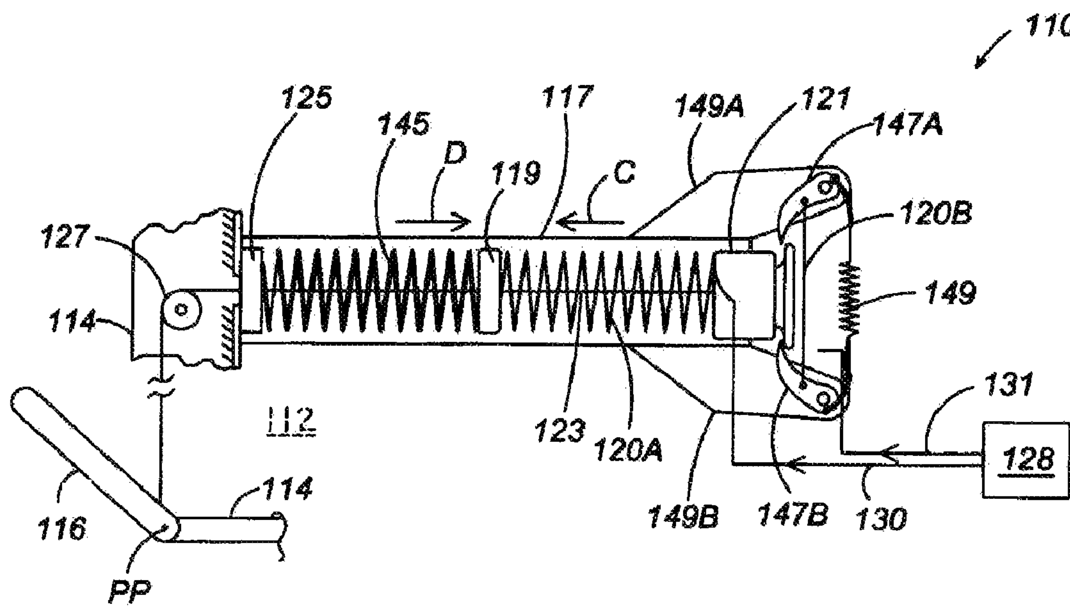
FIG. 2 is a schematic illustration in partial cross-sectional, fragmentary view of a second embodiment of a compartment access system for an interior compartment.

Referring to FIG. 2, a compartment access system 110 for a closure 116 (shown only schematically and not to scale with respect to the other components in FIG. 2) utilizes an active material component in the form of a pretensioned SMA spring 120A to substantially close the closure 116 with respect to a frame 114 that the closure 116 is pivotably connected to such that the closure 116 and frame 114 substantially enclose an interior compartment 112. An additional active material component in the form of an SMA wire 120B is also utilized to cinch the closure 116 to a final closed position. Opening of the closure 116 is manual, and is assisted by gravity to allow the closure 116 to pivot relative to the frame 114 about pivot point PP. The SMA spring 120A is contained within a cylinder 117 between two discs 119, 121 that are movable along the length of the cylinder 117. A cable 123 is fixed at one end to the disc 121, and passes through central openings in the disc 119 and in a fixed disc 125, around a pulley 127 to where it is anchored to the closure 116 off-center from pivot point PP of the closure 116. The closure 116 may be arranged in many other positions with respect to the SMA spring 120A and cylinder 117 by the use of additional, alternatively positioned pulleys or other means for directing the cable 123 to the closure 116.

As described with respect to the embodiment of FIG. 1, a key fob can be utilized to send a remote trigger signal received by a controller 128. The controller 128 then sends an activation signal 130 along a transfer conductor to the SMA spring 120A to activate the spring by resistive heating, causing an actuation force acting on the disc 119 (denoted by arrow C, with a like actuation force acting in the opposite direction on disc 121) resulting in expansion (not shown) of the spring 120A. Expansion of the spring 120A moves both the movable discs 119, 121 outward. Because the cable 123 is fixed to the disc 121, the cable 123 is pulled to the right in FIG. 2, causing the closure 116 to be pulled toward the upper portion of the frame 114, substantially closing the compartment 112. A load-limiting mechanism 145, which in this embodiment is in the form of a compression spring, resists compression due to the movement of disc 119 (caused by actuation of spring 120A) with a resistive force denoted by arrow D. The resistive force of the load-limiting mechanism 145 limits the motion of the closure 116 should the force required to move the closure 116 exceed the force required to begin compressing the load-limiting mechanism 145. Once this plateau is reached, the spring 120A compresses the load-limiting spring 145, which absorbs the remaining motion created by the spring 120A, thus protecting against pinching an object between the frame 114 and the closure 116 as well as ensuring that stress levels within the spring 120A never exceed the plateau level. The spring constant of the load-limiting mechanism 145 may be specifically designed to vary nonlinearly in order to provide an increasing resistance to excessive closing force as the closure 116 closes.

After sensors (not shown) indicate that closure 116 is in a substantially closed position, the controller 128 then sends another activation signal 131 along transfer conductors to the SMA wire 120B to cause contraction of the SMA wire 120B by resistive heating. When SMA wire 120B contracts, it cinches the closure 116 to a final closed position by rotating cinch pawls 147A, 147B inward into contact with the disc 121 to further pull the disc 121 (and thus the cable 123) to the right. (The cinch pawls are mounted on flanges 149A, 149B connected to the cylinder 117 to rotate about respective pivot points that are offset from the SMA wire 120B.) A cinch return spring 149 is also connected in an offset manner to the cinch pawls 147A, 147B such that it provides a spring force resisting extension caused by the inwardly rotating cinch pawls. When the activation signal 131 to the cinch wire 120B is terminated and the SMA wire 120B begins to cool, the cinch return spring 149 helps to return the SMA wire 120B to its preactuated state and release the cinch pawls 147A, 147B from engagement with the disc 121.

Figure 3:
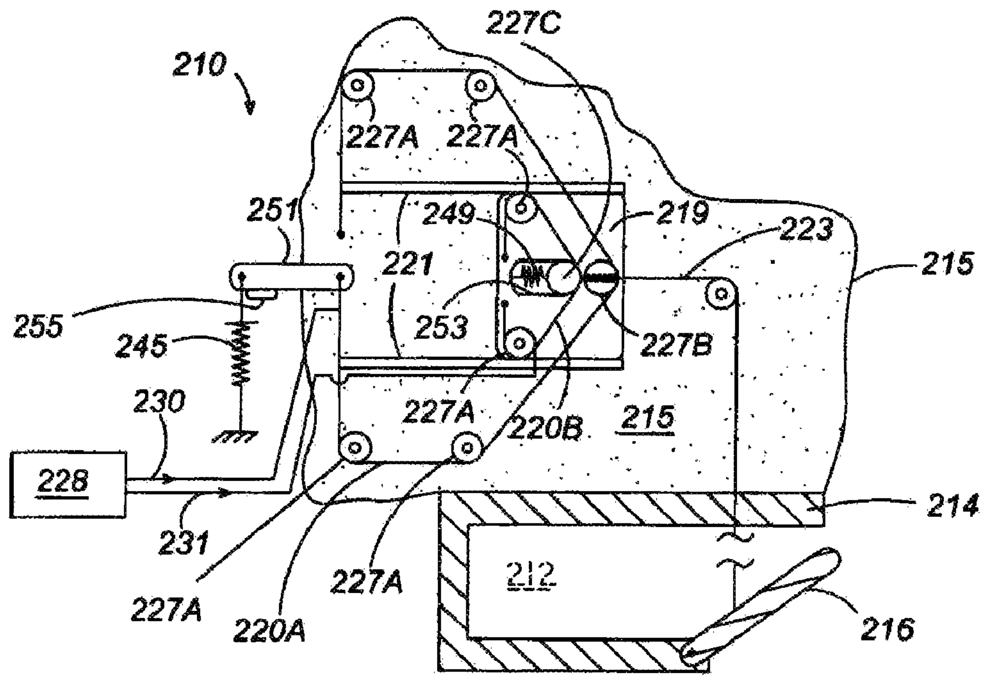
FIG. 3 is a schematic illustration in top view of a third embodiment of a compartment access system for an interior compartment.

Referring now to FIG. 3, another embodiment of a compartment access system 210 for a closure 216 (shown only schematically) utilizes an active material component in the form of an SMA wire 220A to substantially close the closure 216 with respect to a frame 214, such that the closure 216 is pivotably connected to the frame 214 and closure 216 relatively enclose an interior compartment 212. The frame 214 and closure 216 may be referred to together as a storage compartment. The compartment access system 210 also includes an additional active material component in the form of an SMA wire 220B to cinch the closure 216 to a final closed position. Opening of the closure 216 is manual, and is assisted by gravity, as is known in the art. The SMA wire 220A is wound about pulleys 227A that are fixed to a stationary member 215, which may be part of the frame 214. The SMA wire 220A also winds about a pulley 227B that is fixed to a plate 219 that is slidable along rails 221 also fixed to the stationary member 215. One end of the SMA wire 220A is fixed, e.g., to the stationary member 215, while the other end is connected near an end of a lever arm 251. When a trigger signal is sent to the controller 228 (such as by the key fob 24 of FIG. 1), the controller 228 sends an activation signal 230 along a transfer conductor connected to the SMA wire 220A, causing the SMA wire 220A to contract, pulling on pulley 227B, which causes plate 219 to slide to the left. A cable 223 is fixed at one end to the closure 216 and is guided through a slot in pulley 227B such that it connects to an end of a separate pulley 227C slidable within a slot 253 formed in the plate 219. Thus, when the SMA wire 220A contracts, the closure 216 pivots counterclockwise as it is pulled toward a substantially closed position in which it contacts the portion of frame 214 located above the closure 216. As the SMA wire 220A contracts, its actuation force must work against a resistive force provided by a load-limiting mechanism, spring 245. The resistive force of the load-limiting mechanism 245 reduces the net force acting to move the cable 223 and thus the closure 216, providing protection against closing the closure 216 with an excessive force. A stop 255 limits the rotation of arm 251 and allows load-limiting mechanism 245 to be preloaded. This increases the actuation force at which the load-limiting mechanism 245 will begin to stretch. The closure 216 may be arranged in many other positions with respect to the wire 220A by the use of additional, alternatively positioned pulleys or other means for directing the cable 223 to the closure 216.

In order to reach a fully closed position, a second SMA wire 220B is activated by an activation signal 231 sent along a transfer conductor from controller 228. The second activation signal 231 may occur a predetermined amount of time after the activation signal 230 is sent, or the controller may be configured to send activation signal 231 only after optional sensors positioned on the frame 214 or on the closure 216 indicate that the closure is in a substantially closed position appropriate to begin cinching to a final closed position. The second SMA wire 220B is connected at both ends to the plate 219 and is wound around pulleys 227A that are fixed to plate 219 and the pulley 227C that slides in slot 253. As the wire contracts, the pulley 227C slides in slot 253, pulling cable 223 further to the left and compressing cinch return spring 249. When the activation signal 231 to the wire 220B is terminated and the wire 220B begins to cool, the cinch return spring 249 acts as a return mechanism as its biasing force urges wire 220B to its preactuated, stretched state by moving pulley 227C to the right end of the slot 253. The cinch return spring 249 can act as a load-limiting mechanism, as it works against the actuation force of the wire 220B with the wire 220B sliding the plate to the right if the closure 216 is held stationary.

Figure 4:
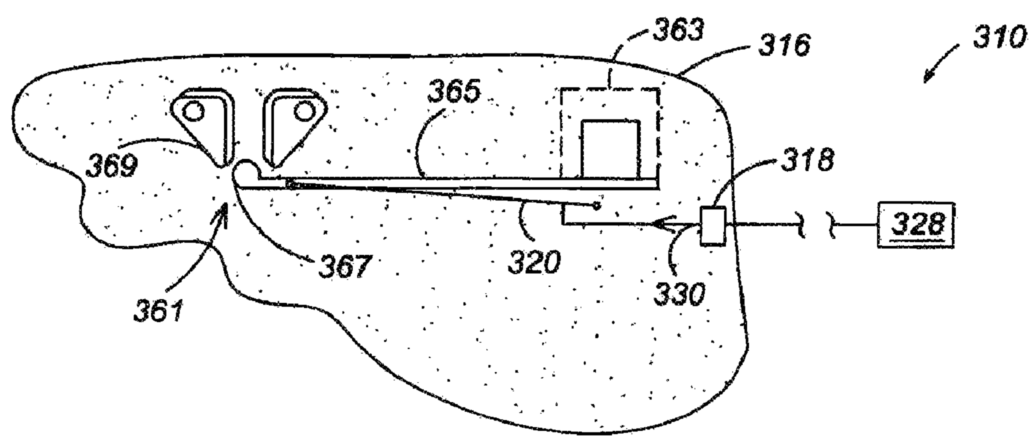
FIG. 4 is a schematic illustration in top view of a fourth embodiment of a compartment access system for an interior compartment.
Figure 11:
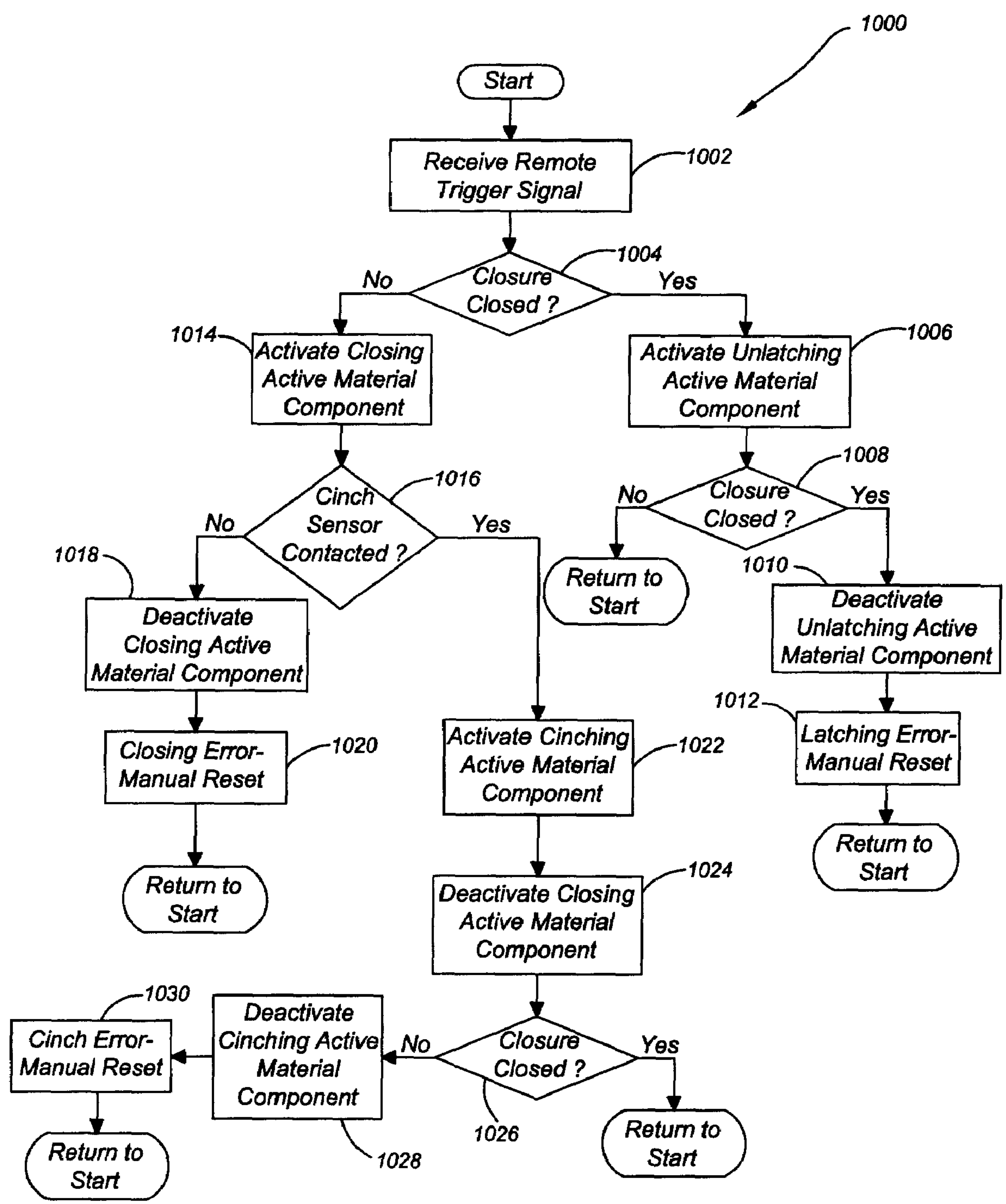
FIG. 11 is a flowchart illustrating a method for controlling access to an interior compartment.

Referring to FIG. 4, another embodiment of a compartment access system 310 includes a latching mechanism 361 mounted on an inside face of a closure 316, which in this embodiment is a vehicle glove box door. The closure 316 may be unlatched manually by pulling downward on a lever 363 mounted on the outside face of the closure 316. Pulling on the lever 363 rotates an arm 365 connected thereto to move a detent 367 out from between a latch 369 mounted to the closure 316 to disengage a striker (not shown) mounted on an adjacent frame. Alternatively, unlatching of the closure 316 can be remotely triggered by a trigger signal from a key fob such as key fob 24 of FIG. 1, to cause a controller 328 to send an activation signal 330 along a transfer conductor connected to an SMA wire 320. (Those skilled in the art will recognize that wire 320 may be alternatively positioned to cause latching of the closure 316 when activated to secure the closure 316 with respect to the frame 314.) The SMA wire 320 is connected at one end to the arm 365 and at another end to the closure 316. Activation of the SMA wire 320 by resistive heating due to the activation signal causes the wire 320 to contract, creating a moment on the arm 365 to rotate the detent 367 out of the latch 369, releasing the closure 316. When the activation signal 330 is terminated, the wire 320 cools, allowing the latch to function when the closure is subsequently manually closed. As described with respect to the method of FIG. 11, the activation signal 330 may terminate automatically if the controller is configured to send the signal only for a predetermined amount of time. This may be desirable to prevent overheating of the wire 320. Alternatively, if no such predetermined shutoff of the activation signal is programmed in the controller, a switch 318 may be provided that is tripped open when the closure 316 is successfully opened to open the circuit between the controller 328 and the wire 320. For instance, the switch 318 may require contact between the closure 316 and a frame to which it is pivotally connected, and therefore the switch 318 opens when the contact is broken.

Figure 5A:
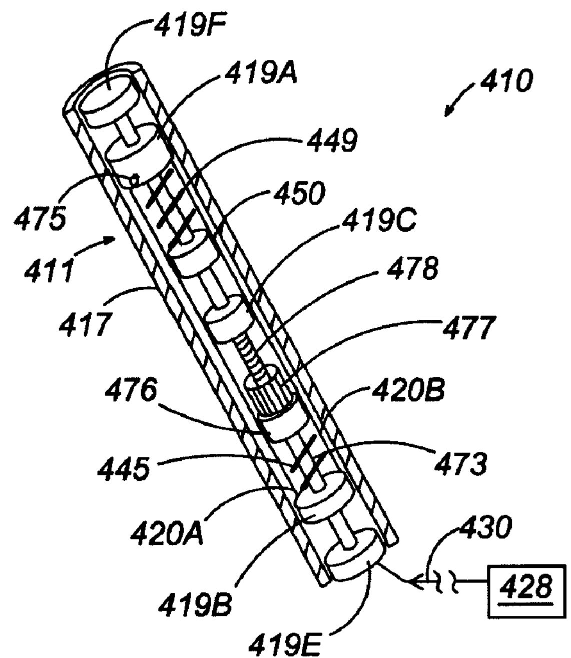
FIG. 5A is a schematic illustration in partial cross-sectional view of a fifth embodiment of a compartment access system for an interior compartment.
Figure 5B:
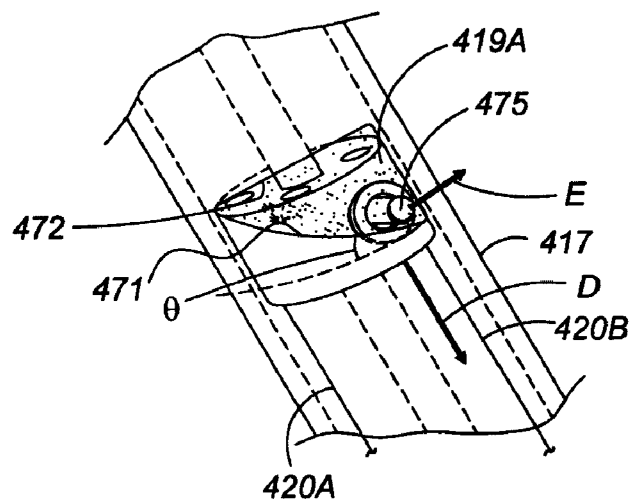
FIG. 5B is a schematic illustration in partial cross-sectional view of a linear to rotary motion conversion mechanism (i.e., a rotary hinge actuator) of the compartment access system of FIG. 5A.

Referring to FIGS. 5A and 5B, another embodiment of a compartment access system 410 includes an "active hinge" rotary actuator 411 that has active material components in the form of SMA wires 420A and 420B that contract when activated via a remotely triggered activation signal 430 from a controller 428, converting linear motion into rotary motion via a sloped edge 471 of an opening 472 (see FIG. 5B) formed in a cylindrical shell 417. The shell 417 may be referred to as a hollow tube. The shell 417 houses the SMA wires 420A, 420B and other necessary components as described below. The activation signal 430 is provided along a transfer conductor operatively connected through conductive bearings 419E and 419F and conductive portions of the central rod 473 to respective movable wire anchor discs 419A, 419B (also referred to herein as movable members). Disc 419A is translatable with respect to central rod 473 while disc 419B is both translatable and rotatable with respect to central rod 473. For purposes of clarity in the drawing, the conductor is shown connected to only one of the conductive bearings 419E, but a conductor also connects to bearing 419F. The disc 419B is connected to an opposite polarity than disc 419A. Disc 419C isolates the rod 473 into two portions, each having a different potential.

When the SMA wires 420A, 420B are activated, they contract, pulling downward on the movable disc 419A with an actuation force. As best viewed in FIG. 5B, an extension 475 of the movable disc 419A captured within the opening 472 slides along the sloped edge 471 pushing in a circumferential direction on the cylindrical shell 417, thereby converting the linear motion of the contracting SMA wires 420A, 420B, into rotary motion and the actuating force (indicated by arrow D) into rotational torque (indicated by arrow E) due to the pitch □ of the sloped edge 471 apparent in FIG. 5B. A closure (not shown, but such as closure 416 of FIG. 5C) is operatively connected to the shell 417 so that a lower lengthwise edge of the closure is parallel with the axial length of the shell 417 so that the closure pivots when the shell 417 rotates, causing the closure to either open or close, depending on the configuration of the connection. Alternatively, the shell 417 could be held stationary so that the rod 473 rotates when the wires 420A, 420B are activated. In still another alternative, the shell 417 could be connected to a rotary cinching mechanism such as cinching mechanism 32 in FIG. 1 to cause cinching of a closure. Furthermore, as another alternative, the shell 417 could be operatively connected to a latch mechanism, such as by connection to the arm 365 in FIG. 4, to cause unlatching (or latching) of the latch mechanism due to the rotational torque.

The compartment access system 410 of FIGS. 5A and 5B includes two compression springs. A return spring 449 is attached between the movable disc 419A and a return spring adjustment mechanism 450, also referred to as a stopper that is fixed to the central rod 473 at a desired axial location, as discussed below. The return spring 449 resists the compression caused by the contraction of the SMA wires 420A, 420B and is configured with a stiffness designed to expand when the wires 420A, 420B cool, helping to stretch the wires 420A, 420B and return them to their preactuation lengths. The return spring adjustment mechanism 450 may be adjusted by tension, fasteners or otherwise to different axial positions along the length of the central rod 473 to vary the preloaded length of the spring 449 (i.e., the length of the spring when the wires 420A and 420B are not activated), thereby varying a return force the spring 449 will exert opposing the actuation force of the wires 420A, 420B and urging the wires to stretch back to their preactuation lengths after the activation signal 430 is terminated.

A load-limiting mechanism, which in this embodiment is a compression spring 445, is connected between the movable disc 419B and a spacer tube 476 concentric with the central rod 473. The axial position of spacer tube 476 is adjustable along the length of the central rod 473 by adjusting an extended length nut 477 along a threaded portion 478 of the central rod 473. The spring 445 is designed with a stiffness that is intended to act against contraction forces above a predetermined level by resisting contraction of the SMA wires 420A, 420B, thus limiting the maximum rotational torque exerted on the cylindrical shell 417 (and the closure, cinching mechanism or latch operatively connected thereto). Because the nut 477, spacer tube 476 and threaded portion 478 of the central rod 473 allow adjustment of the preloaded length of the load-limiting spring (i.e., the length of the spring when the wires 420A and 420B are not activated), these components serve as a load-limiting adjustment mechanism that varies the load-limiting force exerted by the spring 445 in opposition to the actuation force of the wires 420A, 420B. In an alternative embodiment of a compartment access system, a rotary hinge actuator like that of FIGS. 5A and 5B could be employed, except that a return spring and a load-limiting member could be in the form of extension springs extending between the ends of the central rod 473 and the discs 419A, 419B, respectively. In such an embodiment, the springs would resist extending when the SMA wires contracted, providing a return force and a load-limiting force, respectively.

Figure 5C:
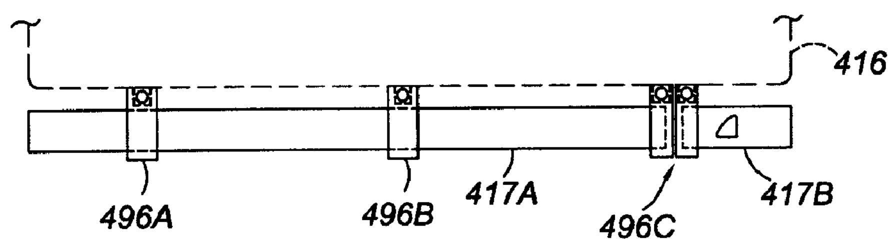
FIG. 5C is a schematic illustration in side view of an alternative configuration of an outer shell of the rotary hinge actuator of FIGS. 5A and 5B.

Referring to FIG. 5C, an alternative embodiment of the outer shell or tube of the rotary hinge actuator 411 of FIGS. 5A and 5C may be formed in two pieces, a first shell portion 417A and a second shell portion 417B (which may also be referred to as a first tube and a second tube, respectively. (The internal components of the actuator 411, including the extension 475 on the movable disc 419A are not shown for purposes of clarity in FIG. 5C, but are contained within the shell portions 417A and 417B.) Clamps 496A, 496B and 496C operatively connect a closure 416 to the first and second shell portions 417A and 417B for common rotation. Extensions of the closure 416 are captured within the clamps 496A, 496B and 496C when the clamps are tightened. Clamp 496C also operatively connects the two shell portions 417A and 417B, and allows for their relative rotation as well as a limited amount of relative axial translation, prior to tightening the clamp 496C. Clamp 496C has a partial circumferential slot shown in FIG. 5C and is solid on the side not shown in FIG. 5C. Clamp 496C is also referred to as a tightenable connector. Thus, clamp 496C, in combination with the two shell portions, serves as an adjustment mechanism that allows the second shell portion 417B to be slid and turned to a position such that the extension 475 of the movable disc 419A is in contact with the sloped edge of the opening in the second shell portion 417B prior to activation of the wires 420A, 420B. This ensures that all of the wire contraction will be converted into rotary motion. Furthermore, with a two-piece shell, the output torque and amount of rotation of the active hinge rotary actuator can be modified by simply unclamping the second shell portion 417B and exchanging it with a modified second shell portion having a differently sloped opening (i.e., an opening with a different pitch), while all other actuator components remain unchanged.

Referring to FIG. 6, another embodiment of a compartment access system 510 is a linear cinch 532 actuated by an SMA wire 520 for cinching a closure 516 with respect to a frame 514. The SMA wire 520 is connected at one end to a first lever 551A that is grounded at a pivot point 557A to a stationary member such as the frame 514. The closure 516 and frame 514 may be referred to together as a storage compartment 512. A controller 528 is operatively connected to the SMA wire 520 and sends an activation signal 530 along a transfer conductor to cause resistive heating and contraction of the wire 520 in response to a remote trigger signal sent to the controller 528 such as by a key fob 24 shown in FIG. 1. The other end of the SMA wire 520 is connected to a linear cinch 532 that is positioned such that at least a guide pin 570 on the cinch 532 travels within a channel 553 formed in a stationary member such as a portion of the frame 514 when the SMA wire 520 contracts, thus moving a hooked portion 533 of the cinch 532 into engagement with a latch hasp 569 connected to the closure 516 to cinch the closure 516 to the frame 514. A separate, manually-operated mechanical or active materials-based latching mechanism may then be utilized to secure the latch hasp 569 (or a separate hasp) to the frame 514, thus latching the closure 516 even when the SMA wire 520 cools and the cinch 532 moves to the right as the guide pin 570 moves along the channel 553 to release the hasp 569.

The compartment access system 510 includes a load-limiting mechanism in the form of an extension spring 545 connected at one end to the lever arm 551A, opposite the pivot point 557A from the SMA wire 520, and at another end to a stationary member such as the frame 514. A physical stop 580 prevents spring 545 from rotating the arm 55 1A clockwise during normal operation. When the wire 520 contracts, the actuation force will pull outward on both ends of the spring 545 via the lever arm 551A. The spring 545 is configured with a stiffness that provides an adequate resistive force acting inward on the lever arm 551A to prevent the cinch 532 from moving which an excessive force. A return spring 549 may be connected between the cinch 532 and the frame 514 to help return the wire 520 to its preactuation position as it cools.

FIG. 7 shows another embodiment of a compartment access system 610, shown in fragmentary view, that is identical to the system 510 of FIG. 6 (controller not shown) except that the linear cinch 532 is replaced by a rotary cinch 632 centered to rotate about the pivot point 657B. The cinch 632 is grounded at its pivot point 657B to a stationary member such as a compartment frame (not shown) as is the right end of spring 645. With respect to both FIGS. 6 and 7, it should be appreciated that the cinching function may be carried out without providing any load-limiting mechanism. A torsional return spring 649 may be connected to cinch 632 to help return active material wire 620 to its preactuation position as the wire 620 cools. Additionally, many other geometrical latch hasp and cinch configurations may be used within the scope of the invention.

Figure 10:
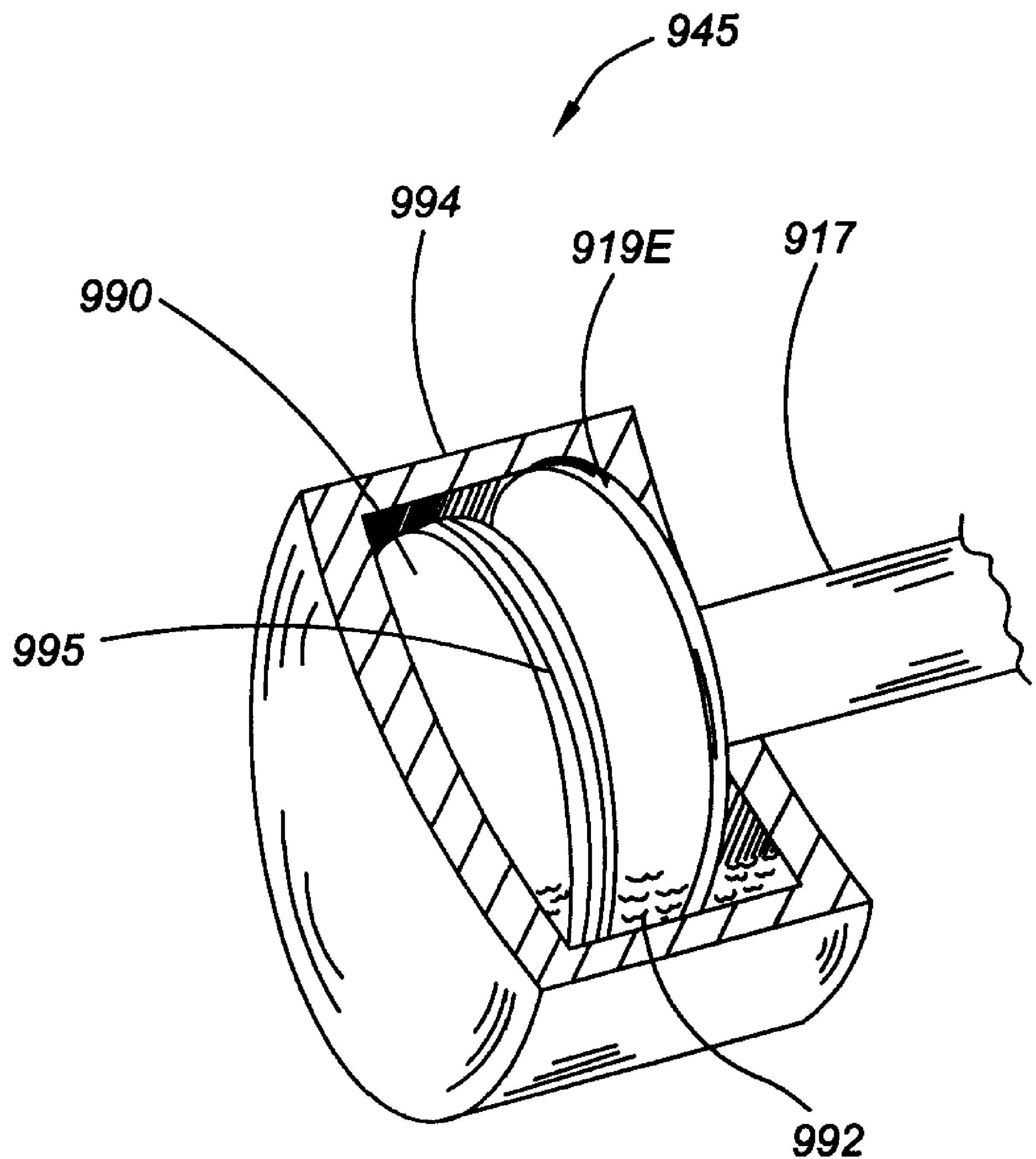
FIG. 10 is a schematic perspective illustration in partial cross-sectional view of a third load-limiting mechanism for use with a rotary motion compartment access system such as that of FIGS. 5A and 5B.

FIGS. 8 through 10 illustrate various embodiments of load-limiting mechanisms for use with a rotary motion compartment access system such as that of FIGS. 5A and 5B. FIG. 8 illustrates a load-limiting mechanism 745 that includes a breakaway adjustable tensioner 779 fastened with an adjustable screw 780 to the end of a rotating cylindrical shell 717 of a compartment access system such as that of FIGS. 5A and 5B. A center rod 773 corresponds to rod 473 of FIG. 5A. A bearing 781 allows the shell 717 to rotate relative to the rod 773. Pretensioned springs 783 apply force from the tensioner 779 to balls 784 through tabs 782 extending through an intermediate disc 719D, thus creating resistance to relative rotation between tensioner 779 and shell 717. As with the cylindrical shell 417 of FIGS. 5A and 5B, the cylindrical shell 717 rotates due to activation and resulting actuation of active material components (not shown) but connected to discs concentric with rod 773 in like manner as in FIG. 5A. Unlike in FIG. 5A, the closure is connected for rotation with the tensioner 779 rather than the shell 717. When the rotational torque of the shell 717 and tensioner 779 is excessive, resistance to relative rotation provided through adjustably tensioned spring-biased balls 784 between the shell 717 and the tensioner 779 is overcome and the tensioner 779 does not rotate with the shell. Thus, excessive rotational torque of the shell 717 is not transferred to the closure operatively connected with the shell 717.

FIG. 9 illustrates another load-limiting mechanism 845 in which a friction coupling between a rotatable cylindrical shell or tube 817A and a second shell or tube 817B. Shell 817A corresponds with the cylindrical shell 417 of FIGS. 5A and 5B, which rotates due to actuation of active material components. A disc or collar 819D is fixed to the tube 817A and a disc or collar 886 is fixed to the tube 817B. Tube 817B is rigidly connected to a closure (not shown) such that the closure pivots (either opened or closed) via rotation of the tube 817B. A friction-based material is disposed on or between collar 819D and a disc or collar 819A that is keyed to the tube 817B via a key 888 to transfer torque from the collar 819A to the tube 817B. Friction between the collars 819D and 819A is adjusted by rotating and then fixing the axial position of the adjusting collar 886 on tube 817B to compress a spring 884 between the collars 886 and 819A. The adjusting collar 886 thus serves as an adjustment mechanism to adjust the frictional force opposing the rotational torque of the tube 817A. Thus, rotational motion of tube 817A is transferred to tube 817B, and to the closure attached thereto at levels of torque that do not overcome the frictional resistance to relative rotation between the collars 819A and 819D. However, at some level of rotational torque deemed to be excessive, such as when the closure is blocked and cannot pivot, the frictional resistance between the collars 819A and 819D will be overcome and rotation of the tube 817A will not be transferred to the tube 817B, preventing an excessive force from acting on the closure.

Referring to FIG. 10, a load-limiting mechanism 945 is illustrated that uses active materials, specifically, an MR fluid, to provide resistance to rotation of a rotating disc 919E attached for rotation with a tube 917, which may correspond with tube 417 in the rotary hinge mechanism in FIGS. 5A and 5B. The mechanism 945 may be referred to as a magnetorheological clutch or lock. The disc 919E may rotate due to actuation of active material components acting to rotate the tube 917, just as tube 417 of FIGS. 5A and 5B is rotated. A permanent magnet 990 activates MR fluid 992 contained within a housing 994, raising the shear strength of the MR fluid and impeding the rotation of the disc 919E or locking the disc 919E and therefore the tube 917. Windings 995 may also be provided about the magnet 990. An electrical current can be passed through the windings 995 to either amplify the magnetic field, thus increasing the shear strength of the MR fluid, or canceling the magnetic activation, allowing for easier rotation of the disc 919E. The windings 995 thus act as an adjustment mechanism for the load-limiting mechanism 945.

As described above, a controller is utilized in the compartment access systems described above, and is preprogrammed with an algorithm to control access to the compartment. The algorithm used by the controller is illustrated as a method of controlling access to an interior compartment 1000 in the flowchart of FIG. 11. The method 1000 is described with respect to a compartment access system that combines several of the compartment access systems with active material components described above such that the system is capable of closing to an intermediate closed position (i.e., in which the closure is ready for cinching), cinching to a final closed position and unlatching, based on a remote trigger signal. The method 1000 will thus be described with respect to different compartment access systems described above, but it should be understood that the method 1000 is not limited to use with those specific compartment access systems.

The method 1000 begins with step 1002, in which the controller receives a remotely triggered trigger signal. As described with respect to FIG. 1, the button 22 of the key fob 24 is depressed by an operator to send a trigger signal 26 to controller 28. After receiving this signal, in step 1004, the controller determines whether the compartment closure is in an open position or a closed position (i.e., a final closed position in which the closure has been cinched and latched to a frame). This determination is based upon feedback from one or more sensors capable of sensing information relevant to the position of the closure. For example, in FIG. 1, the cinch sensor 40 indicates contact between the closure 16 and the frame 14, and may be used by the controller 28, (along with stored information regarding whether the SMA wire 20 was previously activated to rotate the cinch 32 into the integrated hasp 38), to make a determination regarding the current position of the closure 16.

If the controller determines in step 1004 that the closure is closed, and assuming that the compartment access system has a latch assembly that utilizes an active material component to unlatch a latching mechanism securing the closure to the frame, such as the compartment access system 310 of FIG. 4, then the method 1000 proceeds to step 1006, in which the controller sends an activation signal to the active material component in order to cause unlatching of the latch (e.g., controller 328 in FIG. 4 sends activation signal 330 to active material component 320 to move detent 367 out of latch 369, unlatching latching mechanism 361). Optionally, the controller may be programmed to continue the activation signal for a predetermined amount of time, referred to in the claims as a first predetermined amount of time. This predetermined amount of time is based on testing of the system to prevent overheating of the active material component that may occur if it were activated for an excessive amount of time.

After activating the unlatching active material component in step 1006, the controller monitors sensor information in step 1008 to determine whether the closure is still in a closed position (i.e., indicating that the activating in step 1006 did not successfully unlatch the latch and allow gravity to cause the closure to move to an open position). If the activating step 1006 is for a predetermined amount of time, as described above, step 1008 may be performed during or after this amount of time. If, however, the activating step is not automatically terminated after a predetermined amount of time, step 1010 is required, deactivating the unlatching active material component, such as by sending a signal to trip a switch that discontinues the activation signal to the active material component, or by any other way of terminating a signal from a controller, as will be understood by those skilled in the art. Whether or not step 1010 is necessary, in step 1012, the controller will send an error signal indicating that the unlatching in step 1006 was not successful. The error signal may be sent to a variety of places, including an LED on the key fob or, assuming the interior compartment is a vehicle glove box, to a dash panel display.

If activating the unlatching active material component in step 1006 (unlatching the latch) has been successful, the controller will determine that the door is not closed in step 1008 (i.e., it has successfully opened such as by gravity after the latch is unlatched), and the opening sequence will be complete. If the activating step 1006 is for a predetermined amount of time, the activation signal will automatically terminate when step 1008 is performed at the end of that predetermined amount of time. If the activating step is not for a predetermined amount of time, a switch will be provided that is tripped by opening of the closure to open the circuit from the controller to the closure, thereby terminating activation of the unlatching active material component. The controller will then return to the start of the method 1000 to be ready to receive and process subsequent remote trigger signals.

In step 1004, if the controller determines that the closure is not closed, it will move to step 1014 in which it sends an activation signal to an active material component in a compartment access system configured to close the closure, such as the rotary hinge actuator of FIGS. 5A and 5B, referred to in step 1014 as "activate closing active material component" (e.g., controller 428 in FIG. 5A sends an activation signal to active material components 420A and 420B to cause rotation of shell 417 which is operatively connected to a closure, thus substantially closing the closure). Optionally, the controller may be programmed to continue the activation signal for a predetermined amount of time, referred to in the claims as a second predetermined time period. During this time period or at the end of the time period, if the controller does not receive information (e.g., from sensors) allowing the controller to make another determination in step 1016 that the closure has substantially closed (e.g., that a cinch sensor located on a closure, such as sensor 40 in FIG. 1, has contacted the frame), the controller will send an error signal under step 1020 indicating that the closing in step 1014 was not successful. The error signal may be sent to a variety of places, including an LED on the key fob or, assuming the interior compartment is a vehicle glove box, to a dash panel display. If, however, the activation in step 1014 is not for a predetermined amount of time, the active material component used for closing the closure will first be deactivated in step 1018.

If activating the hinge (closing the closure) in step 1014 has been successful, the controller will determine that the closure has substantially closed as the cinch sensor has been contacted in step 1016. At this point, assuming that the compartment access control system has a cinch that performs the final portion of the closing motion to move the closure to a final closed position, under step 1022, the controller will send an activation signal to an active material component operatively connected to a cinch mechanism in order to cinch the closure to the frame (e.g., such as activation signal 30 sent to active material component 20 to rotate cinch 32 in FIG. 1). Optionally, the controller may be programmed to continue the activation signal of step 1022 for a predetermined amount of time, which may be referred to as a third time period. If not, the controller will need to deactivate the closing active material component in a step 1024, such as by sending a deactivation signal to trip a switch, causing a circuit between the activation signal and the closing active material component to be interrupted. During this time period or at the end of the time period, if the controller does not receive information (e.g., from sensors) allowing the controller to make another determination in step 1026 that the cinch has moved the closure to a final closed position (e.g., that a cinch sensor located on a closure, such as sensor 40 in FIG. 1, has contacted the frame), the controller will send an error signal under step 1030 indicating that the cinching in step 1030 was not successful. The error signal may be sent to a variety of places, including an LED that lights up the key fob (for instance, the button 22 on the key fob 24 of FIG. 1 could light up) or, assuming the interior compartment is a vehicle glove box, the error signal could be sent to a dash panel display. The controller will then return to the start of the algorithm to be ready to receive and process subsequent remote trigger signals. If, however, in step 1026, the controller determines that the closure had been cinched to a final closed position, the closing sequence will be complete. The controller will then return to the start of the algorithm to be ready to receive and process subsequent remote trigger signals. Note that if the controller is not programmed to maintain the cinching activation signal of step 1022 for only the third period of time, the controller will need to deactivate the cinching active material in step 1028, such a by sending a deactivation signal to trip a switch interrupting a circuit between the activating signal and the cinching active material component.

While the best modes for carrying out the invention have been described in detail, those familiar with the art to which this invention relates will recognize various alternative designs and embodiments for practicing the invention within the scope of the appended claims.

The invention claimed is:

1. A compartment access system comprising:

a frame partially defining an interior compartment;

a closure operatively connected to and movable with respect to said frame and further defining said compartment; and at least one active material component operatively connected to said closure and configured for remotely triggered activation to actuate and thereby affect access to said compartment, wherein activation by applying energy directly to said active material component changes a dimension of the active material component to move said closure with respect to said frame to one of an open position and a substantially closed position of said closure to respectfully allow and prevent access to said compartment.

2. The compartment access system of claim 1, wherein said closure, said frame and said active material component are further configured to permit manual movement of said closure with respect to said frame for opening and closing said compartment.

3. The compartment access system of claim 1, wherein activation of said active material component changes a dimension of said active material component to move said closure to a final closed position by cinching said closure with respect to said frame when actuated.

4. The compartment access system of claim 1, further comprising:

a latch assembly; and wherein activation of said active material component changes a dimension of said active material component to perform one of latching or unlatching said latch assembly, thereby securing or releasing said closure with respect to said frame, respectively.

5. The compartment access system of claim 1, wherein said active material component actuates with an actuation force, and further comprising:

a load-limiting mechanism operatively connected to said closure and configured to provide a resistive force opposing the actuation force to limit force conveyed to said closure.

6. The compartment access system of claim 5, further comprising:

an adjustment mechanism operatively connected to said load-limiting mechanism and adjustable to vary the resistive force of said load-limiting mechanism.

7. The compartment access system of claim 1, wherein said active material component actuates with an actuation force, and further comprising:

a return mechanism providing a return force opposing the actuation force to return said active material component to a preactuated state after activation; and an adjustment mechanism operatively connected to said return mechanism and adjustable to vary the return force of said return mechanism.

8. The compartment access system of claim 1, further comprising:

a central rod;

a hollow tube encircling said rod and having an opening therein, wherein said closure is operatively connected to said hollow tube;

a movable member translatable and rotatable with respect to said rod and operatively connected with said active material component;

wherein said movable member is substantially surrounded by said tube and extends through said opening; wherein said opening is formed with a sloped edge to convert linear motion of said movable member into rotary motion of said hollow tube when said active material component actuates to move said movable member; and wherein said opening in said hollow tube is of a sufficient axial and circumferential size to permit manual movement of said closure without affecting tension of said active material component.

9. The compartment access system of claim 8, wherein said tube is a first tube, and further comprising:

a second tube axially aligned with said first tube and further encircling said rod; and a tightenable connector operatively connecting said first and second tubes and configured to permit movement of the first tube relative to the second tube prior to tightening of said connector to permit adjustment of said first tube so that said extension contacts said sloped edge.

10. The compartment access system of claim 1, further comprising:

a controller operable for receiving a remotely triggered trigger signal and providing an activation signal to activate said active material component in response to said trigger signal;

at least one sensor operatively connected to said closure and to said controller operable to determine at least a component of an actuation force acting on said closure due to activation of said active material component and to send a sensor signal to said controller based on said actuation force; and wherein said controller is configured to terminate said activation signal based on said sensor signal.

11. The compartment access system of claim 1, wherein said closure is characterized by a weight, and further comprising:

a counter-balance member operatively connected to said closure and configured to provide a counter-balance force opposing the weight of said closure.

12. A storage container comprising:

a frame partially defining an interior compartment;

a closure operatively connected to and movable with respect to said frame and further defining said compartment; and at least one active material component operatively connected to said closure and configured to move said closure with respect to said frame when activated by an activation signal to thereby affect access to said compartment.

13. The storage container of claim 12, wherein said storage container is a vehicle glove box.

* * * * *